Patented June 23, 1936

2,044,796

UNITED STATES PATENT OFFICE 2,044,796

STABLE REDUCTION COMPOUNDS OF THE THIOINDIGOIDE SERIES AND PROCESS OF PREPARING THEM

Karl Krauss, Frankfort-on-the-Main-Fechenheim, and Alfred Hagenböcker, Frankfort-on-the-Main-Hochst, Germany, assignors to General Aniline Works, Inc., New York, N. Y., a corporation of Delaware No Drawing. Application April 4, 1930, Serial No. 441,720. In Germany April 15, 1929

11 Claims. (Cl. 260—53)

The present invention relates to new stable reduction compounds of the thioindigoide series and to a process of preparing them.

We have found that the thioindigoide dyestuffs which contain in their molecule at least one substituent of the group consisting of halogen, alkyl and alkoxy and within this group especially the dyestuffs of the following general formula:

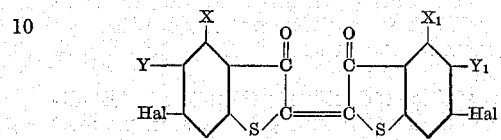

wherein X and $X_1$ stand for hydrogen or alkyl and Y and $Y_1$ represent hydrogen or halogen are capable of forming reduction products of hitherto unknown properties. Whereas the well known leuco compounds of the said dyestuffs are easily soluble in dilute alkalies and are easily reconverted by oxygen or air into the dyestuffs proper, our new reduction products are characterized by their difficult solubility in alkali and by their high stability to oxygen or air.

The conditions under which our new reduction products are obtainable differ to a certain degree according to the properties of the particular dyestuff used. In the examples hereafter following we have stated such conditions as have been found in each case to be most suitable.

In certain cases we prefer to produce the new stable reduction products by treating the thioindigoide dyestuff with considerably smaller quantities of a reducing agent and especially of an alkali than are commonly used in preparing a vat of the dyestuff in question, whereby the staple reduction products are obtainable directly, i. e. they separate directly from the reaction mixture.

In other cases it is necessary to use larger quantities of the reducing agent and of the alkali. In these cases the stable reduction products are advantageously separated from the reaction mixture or at least their separation is completed by adding to the reaction mixture an acid until the alkaline reaction against phenolphthaleine paper has disappeared. When using as the starting material a dyestuff which reacts only difficultly with the reducing agent owing to its physical form or its chemical constitution it is sometimes advantageous to add to the reaction mixture an alcohol, such as ethyl alcohol or an agent of similar reaction.

At the present time we are not able to give an exact theoretical explanation of the chemical structure of our new products. They are capable of yielding prints in the same way as the dyestuffs themselves but with our new stable products prints are also obtainable when employing considerably smaller quantities of the reducing agent as are necessary with the dystuffs proper which fact proves that our new stable products are reduction compounds of the dyestuffs.

On the other hand their stability to air or oxygen and their complete or almost complete insolubility in alkali clearly show that they are different from the so-called leuco compounds.

The following examples serve to illustrate the invention, but they are not intended to limit it thereto; the parts being by weight:

(1) 300 g. of a 20% paste of 6,6'-dichloro-thioindigo of the formula:

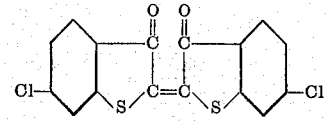

are heated up to 70° C. with 2 liters of water and 62 cc. of caustic soda lye of 33° Bé., whereafter 40 g. of sodium hydrosulfite concentrated powder are added, the whole is stirred for 5 minutes at 70° C., and carbonic acid is introduced while cooling the liquid externally. The paste thus obtained which, advantageously, is rendered weakly acid, is filtered by suction, washed and ground for some time whereby a reddish paste is obtained which is insoluble in dilute alkali.

(2) 512 g. of a 13% paste of 4,4'-dimethyl-6,6'-dichloro-thioindigo of the formula:

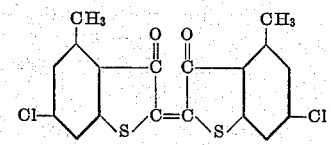

are stirred with 400 cc. of alcohol in 2 liters of water, whereafter 62 cc. of caustic soda solution of 33° Bé. are added. The reaction mixture is heated to 70° C., and 40 g. of sodium hydrosulfite concentrated powder are added. After 5 minutes carbonic acid is introduced until the alkaline reaction of the reaction mixture against phenolphthaleine has disappeared. During this operation it is advantageous to cool the liquid externally. By filtering, washing and grinding the product a light-yellowish-brown paste is obtained which when being exposed to the air or allowed to stand for a while only assumes a slightly more reddish coloration and is insoluble in dilute alkali.

(3) 300 g. of a 20% paste of 6,6'-dichloro-4-methyl-thioindigo of the formula:

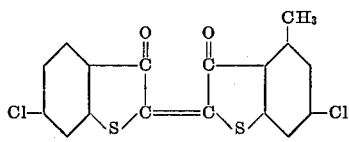

are heated up to 60° C.–65° C. with 2 liters of water and 87 cc. of caustic soda lye of 33° Bé. 45 g. of sodium hydrosulfite concentrated powder are added and the whole is stirred for a quarter of an hour at this temperature. The reaction mixture is then cooled, and carbonic acid is simultaneously introduced until the alkaline reaction of the reaction mass against phenolphthaleine paper has disappeared. By filtering, washing and grinding for some time, the paste which, advantageously, is rendered weakly acid, a reddish-brown paste is obtained which is scarcely soluble in dilute alkali.

(4) 1 kilo of 4,4'-dimethyl-6,6'-dichloro-thioindigo of the formula:

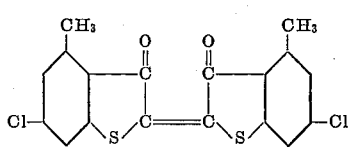

in the form of an aqueous paste is mixed with 50 liters of water, and after addition of 1200 g. of caustic soda solution of 40° Bé., the mixture is heated to 70–75° C. At this temperature 1 kilo of sodium hydrosulfite concentrated powder is added and stirring is continued for some time. A brownish product is separated which probably has a ketonic structure.

The new stable reduction compound of the 4,4'-dimethyl-6,6'-dichlorothioindigo is practically insoluble even in hot aqueous alkalies, but soluble in a large quantity of alcohol or glacial acetic acid; in concentrated sulfuric acid it dissolves readily to a green solution.

(5) The same product is obtained by substituting in Example 4, for the caustic soda solution 1.5 kg. of calcined sodium carbonate, increasing the temperature of reaction to about 90° C. and keeping the mass at this temperature for about 2 hours until the reaction is complete.

(6) By exchanging in Example 4 the caustic soda solution for 3 kilos of ammonia of 20 per cent. strength and stirring the mass for about 3½ hours at a temperature between 70° C. and 75° C., a product is obtained which is identical with that made according to Example 4.

(7) 1 kilo of 4,4'-dimethyl-5,6,5',6'-tetrachlorothioindigo of the formula:

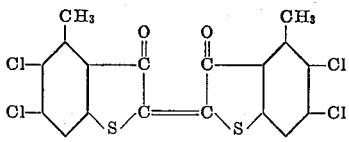

is heated up to 60° C.–65° C. with 1 kilo of caustic soda solution of 40° Bé. and 50 liters of water. Thereafter 600 g. of sodium hydrosulfite are added and the whole is stirred for a short time at 60° C.–65° C. The reduction compound which has separated is filtered by suction and washed until neutral. It is practically insoluble in aqueous alkalies.

We claim:

1. The stable reduction products of the dyestuffs of the following general formula:

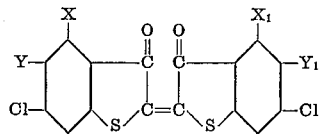

wherein X and $X_1$ stand for hydrogen or methyl and Y and $Y_1$ represent both hydrogen or both chlorine, the said products being stable to air or oxygen, being difficultly soluble in alkali and yielding prints in the usual way but also with considerably smaller quantities of the reducing agent than are required in the case of the dyestuffs proper.

2. The stable reduction products of the dyestuffs of the following general formula:

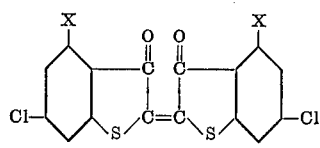

wherein X represents hydrogen or methyl, the said products being stable to air or oxygen, difficultly soluble in alkali, yielding prints in the usual way also with considerably smaller quantities of reducing agent than are required in the case of the dyestuffs proper.

3. The stable reduction product of 4.4'-dimethyl-6.6'-dichlorothioindigo, the said product being stable to air and oxygen, being difficultly soluble in alkali and yielding prints in the usual way but also with considerably smaller quantities of the reducing agent than are required in the case of the dyestuff proper.

4. The stable reduction product of 6.6'-dichloro-thioindigo, the said product being stable to air and oxygen, being difficultly soluble in alkali and yielding prints in the usual way but also with considerably smaller quantities of the reducing agent than are required in the case of the dyestuff proper.

5. The stable reduction product of 4.4'-dimethyl-5.6.5'.6'-tetrachloro-thioindigo, the said product being stable to air and oxygen, being difficultly soluble in alkali and yielding prints in the usual way but also with considerably smaller quantities of the reducing agent than are required in the case of the dyestuff proper.

6. The stable reduction products of thioindigoide dyestuffs which contain in their aromatic radicals at least one substituent of the group consisting of halogen and methyl, said products being stable to air or oxygen, being difficultly soluble in alkali and yielding prints in the usual way but also with considerably smaller quantities of the reducing agent than are required in the case of the dyestuff proper.

7. The process which comprises treating a thioindigoide dyestuff which contains in its aromatic radicals at least one substituent of the group consisting of halogen and methyl with a reducing agent in the presence of an alkali and then treating the reaction mixture with an acid until the alkaline reaction against phenolphthaleine paper has disappeared.

8. A process in accordance with claim 7 wherein the quantities of the reducing agent and of the alkali used are approximately the same as are used in preparing a vat of the dyestuff in question.

9. A process in accordance with claim 7 wherein an aliphatic alcohol is added to the reaction mixture.

10. The process of preparing new reduction products of thioindigo dyes which comprises reducing a thioindigo dye in the presence of an alkaline reacting substance insufficient in amount and strength to cause complete reduction of the dye to the soluble form, and then treating the resulting product with a non-oxidizing acid to render it acidic.

11. A modified leuco derivative of a thioindigo dye characterized by stability in air, relative insolubility in water, relative insolubility in alkaline solutions, and yielding prints in the usual way, but with smaller quantities of the reducing agent than required by the dye as such, said modified leuco derivative being obtainable according to the process of claim 10.

KARL KRAUSS.
ALFRED HAGENBÖCKER.